United States Patent
Torres et al.

(10) Patent No.: US 7,307,847 B2
(45) Date of Patent: Dec. 11, 2007

(54) PLUGGABLE VIDEO MODULE

(75) Inventors: Luis Torres, Rolling Meadows, IL (US); Mark Benton, Chicago, IL (US); Anthony Kowalkowski, Chicago, IL (US); Chris Liston, Lisle, IL (US); Cesar Yanez, Aurora, IL (US); Bernard Mercado, Chicago, IL (US)

(73) Assignee: Stratos International, Inc., Chicago, IL (US)

( * ) Notice: Subject to any disclaimer, the term of this patent is extended or adjusted under 35 U.S.C. 154(b) by 0 days.

(21) Appl. No.: 11/180,025

(22) Filed: Jul. 13, 2005

(65) Prior Publication Data
US 2005/0245109 A1    Nov. 3, 2005

Related U.S. Application Data

(63) Continuation of application No. 10/646,441, filed on Aug. 24, 2003, now Pat. No. 7,215,554.

(51) Int. Cl.
*H05K 7/02*    (2006.01)

(52) U.S. Cl. ............... 361/730; 361/752; 361/747; 361/732; 361/740; 174/50.52; 174/50.53; 385/88; 385/92

(58) Field of Classification Search ......... 361/747, 361/728–732, 740, 754, 759, 753, 752, 801, 361/799; 439/352, 357, 609, 372; 174/50, 174/50.52, 50.53; 385/88, 92
See application file for complete search history.

(56) References Cited

U.S. PATENT DOCUMENTS

| | | | | |
|---|---|---|---|---|
| 4,273,413 A | * | 6/1981 | Bendiksen et al. ............ | 385/88 |
| 4,563,592 A | * | 1/1986 | Yuhasz et al. ............... | 307/115 |
| 5,128,835 A | * | 7/1992 | Rudy et al. .................. | 361/818 |
| 5,515,468 A | * | 5/1996 | DeAndrea et al. ............ | 385/88 |
| 5,708,743 A | * | 1/1998 | DeAndrea et al. ............ | 385/88 |
| 5,767,999 A | * | 6/1998 | Kayner ........................ | 398/164 |
| 5,879,173 A | * | 3/1999 | Poplawski et al. ........... | 439/138 |
| 5,901,263 A | | 5/1999 | Gaio et al. ..................... | 385/92 |
| 6,293,710 B1 | * | 9/2001 | Lampert et al. .............. | 385/78 |
| 6,335,869 B1 | * | 1/2002 | Branch et al. ............... | 361/816 |
| 6,430,053 B1 | | 8/2002 | Peterson et al. ............. | 361/728 |
| 6,434,015 B1 | * | 8/2002 | Hwang ........................ | 361/754 |
| 6,439,918 B1 | * | 8/2002 | Togami et al. .............. | 439/372 |
| 6,447,170 B1 | * | 9/2002 | Takahashi et al. ............ | 385/53 |
| 6,532,155 B2 | * | 3/2003 | Green et al. ................. | 361/733 |

(Continued)

OTHER PUBLICATIONS

SMPTE Engineering Guideline (EG34-1999), Society of Motion Picture & Television Engineers, approved Jan. 15, 2999.

(Continued)

*Primary Examiner*—Tuan T. Dinh
*Assistant Examiner*—Dameon E. Levi
(74) *Attorney, Agent, or Firm*—Karl D. Kovach (57) ABSTRACT

The device includes a housing, a locking and release mechanism, an electrical connector, an optical connector, and pathological circuitry. The housing has a top, a bottom, a front, and a back. The locking and release mechanism is attached to the housing. The electrical connector is attached to the back of the housing. The optical connector is attached to the front of the housing. The pathological circuitry handles pathological conditions associated with digital video signals.

20 Claims, 12 Drawing Sheets

U.S. PATENT DOCUMENTS

| | | | | |
|---|---|---|---|---|
| 6,556,445 B2 | 4/2003 | Medina | | 361/728 |
| 6,570,768 B2 | 5/2003 | Medina | | 361/747 |
| 6,612,858 B1 | 9/2003 | Stockhaus | | 439/352 |
| 6,731,510 B1* | 5/2004 | Hwang et al. | | 361/754 |
| 6,744,963 B2* | 6/2004 | Hwang | | 385/139 |
| 6,762,940 B2* | 7/2004 | Zaremba | | 361/728 |
| 6,786,653 B1* | 9/2004 | Hwang et al. | | 385/92 |
| 6,805,574 B2 | 10/2004 | Huang | | 439/357 |
| 6,854,997 B2* | 2/2005 | Stockhaus | | 439/352 |
| 6,872,094 B1* | 3/2005 | Murr et al. | | 439/607 |
| 6,884,097 B2* | 4/2005 | Ice | | 439/160 |
| 6,890,206 B2* | 5/2005 | Distad et al. | | 439/372 |
| 6,916,196 B2* | 7/2005 | Long et al. | | 439/352 |
| 6,997,622 B2* | 2/2006 | Dodds et al. | | 385/92 |
| 7,118,281 B2* | 10/2006 | Chiu et al. | | 385/53 |
| 7,215,554 B2* | 5/2007 | Torres et al. | | 361/747 |
| 2004/0105239 A1 | 6/2004 | Chiang | | 361/728 |
| 2004/0146266 A1 | 7/2004 | Solheid et al. | | 385/135 |

OTHER PUBLICATIONS

Small Form-Factor Pluggable (SFP) Transceiver Multisource Agreement (MSA), dated Sep. 14, 2000.

\* cited by examiner

PLUGGABLE VIDEO MODULE

This is a continuation of U.S. patent application Ser. No. 10/646,441, filed Aug. 24, 2003, now U.S. Pat. No. 7,215,554 which is hereby incorporated herein by reference.

FIELD OF THE INVENTION

The present invention relates generally to pluggable converter module subassemblies. More particularly, the present invention relates to pluggable electrical/optical converter modules configured to interface with video systems.

BACKGROUND OF THE INVENTION

Pluggable converter modules, such as optoelectronic transceiver modules, are well-known in the computer industry. Conventional optoelectronic transceiver modules are utilized to interconnect circuit cards of communication links and other electronic modules or other subassemblies. Optoelectronic transceiver modules are designed to receive electrical data signals and retransmit these signals as optical signals, and vice versa. Various international and industry standards define the type of connectors used to interface computers to external communication devices, such as modems, network interfaces, and other transceivers. It is desirable to make transceiver modules pluggable so the modules can be easily replaced. It is also desirable to miniaturize transceiver modules in order to increase the port density associated with the network connection (switch boxes, cabling patch panels, wiring closets, computer I/O, etc.).

Numerous standards are known that define form factors for miniaturized electronic devices, such as the Small Form-Factor Pluggable (SFP) standard that specifies an enclosure 9.8 millimeters in height, 13.5 millimeters in width, and a minimum of 20 electrical input/output connections. The specific standards for SFP transceivers are set forth in the "Small Form-Factor Pluggable (SFP) Transceiver Multisource Agreement (MSA)," dated Sep. 14, 2000, which Applicants hereby incorporate by reference. Patents identified by issued U.S. Pat. Nos. 6,570,768, 5,879,173, 5,864,468, 5,734,558, 5,717,533, and U.S. Pat. No. Re 36,820, which were originally assigned to Methode Electronics, Inc, and are now assigned to Stratos Lightwave, both located in Chicago, Ill., disclose improvements to pluggable transceiver modules. Applicants hereby incorporate by reference U.S. Pat. Nos. 6,570,768, 5,879,173, 5,864,468, 5,734,558, 5,717,533, and Re 36,820.

Due to current designs and specifications, conventional optoelectronic transceiver modules are not compatible with video circuitry or connectors. For example, video subassemblies typically require different connectors, such as ST or BNC connectors. Moreover, video subassemblies commonly utilize unidirectional signals, and thus do not always require a bidirectional signal interface as provided by transceiver modules. Furthermore, a conventional transceiver module can only be installed into a host device specifically designed to receive that specific transceiver module.

Additionally, a video signal typically includes pathological problems, which a conventional transceiver module would be unable to accommodate. Most transmitters in optical modules have an automatic power control (APC) circuit that keeps the optical power output at a set level. These circuits assume incoming data will have a constant average duty cycle of about 50% over a period of time. Such a time period is usually in the range of 1 millisecond (ms). Since the pathological condition may last for about 50 ms, the laser driver of the optical transmitter would be adjusted too high or too low, depending upon the duty cycle of the signal. A detailed explanation of "Pathological Conditions in Serial Digital Video Systems" can be found in the publication having said title by SMPTE Engineering Guideline, Number EG 34-1999, by the Society of Motion Picture and Television Engineers approved and published Jan. 15, 1999, which is hereby incorporated by reference.

Accordingly, there is a need for a small, pluggable optical/electrical interface module that has the advantage of a conventional, pluggable, optical/electrical transceiver module, but in addition, the module is compatible with video circuitry and numerous video connector interfaces.

OBJECTS AND SUMMARY OF THE INVENTION

An object of the present invention is to provide a pluggable optical/electrical interface module that is compatible with video signals.

Another object of the present invention is to provide a pluggable optical/electrical module interface that is dummy proof in order to prevent inserting a conventional transceiver module into a video signal interface, host device, or cage.

A further object of the present invention is to provide a pluggable video module interface that is interchangeable with numerous pluggable video modules having different configurations.

An additional object of the present invention is to provide a pluggable video module having multiple transmit or receive interfaces.

Another object of the present invention is to provide a pluggable video module capable of handling pathological conditions typically associated with video signals.

A further object of the present invention is to provide a pluggable video module having variable video connector interfaces.

Accordingly, the present invention provides a pluggable converter module for receiving electrical video signals having a housing with a top, a bottom, a front and a back; a locking and release mechanism attached to the housing; an electrical connector proximate to the back of the housing; only one optical connector proximate the front of the housing; and pathological circuitry for handling pathological conditions associated with digital video signals. The pathological circuitry includes a first capacitor and a second capacitor. The first capacitor has a value of 4.7 uF, and the second capacitor has a value of 4.7 uF. The only one optical connector is a simplex optical connector.

DETAILED DESCRIPTION OF THE PREFERRED EMBODIMENTS

Figure 1:
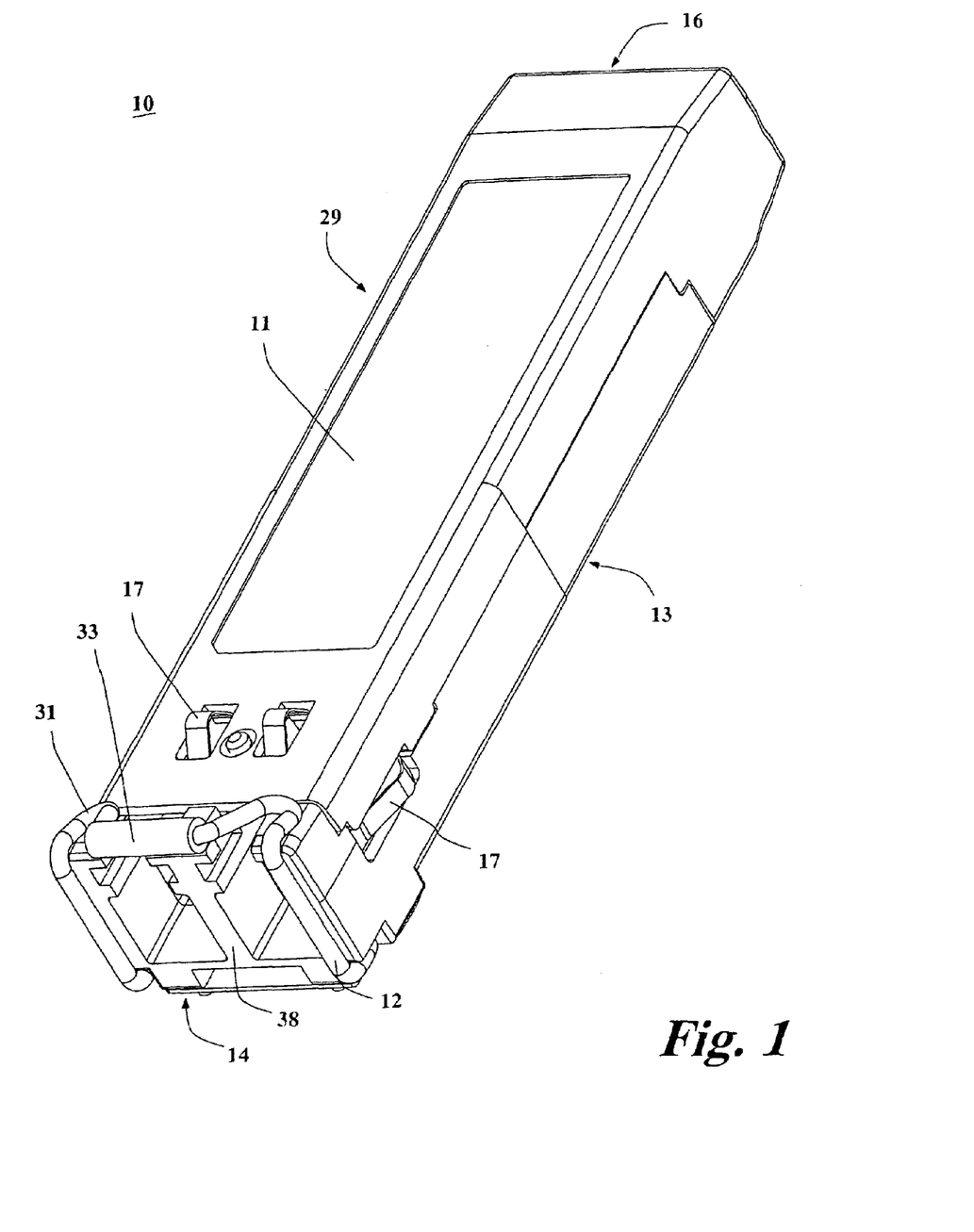
FIG. 1 is a perspective view of the top of a pluggable video module (PVM) configured in accordance with the present invention.
Figure 2:
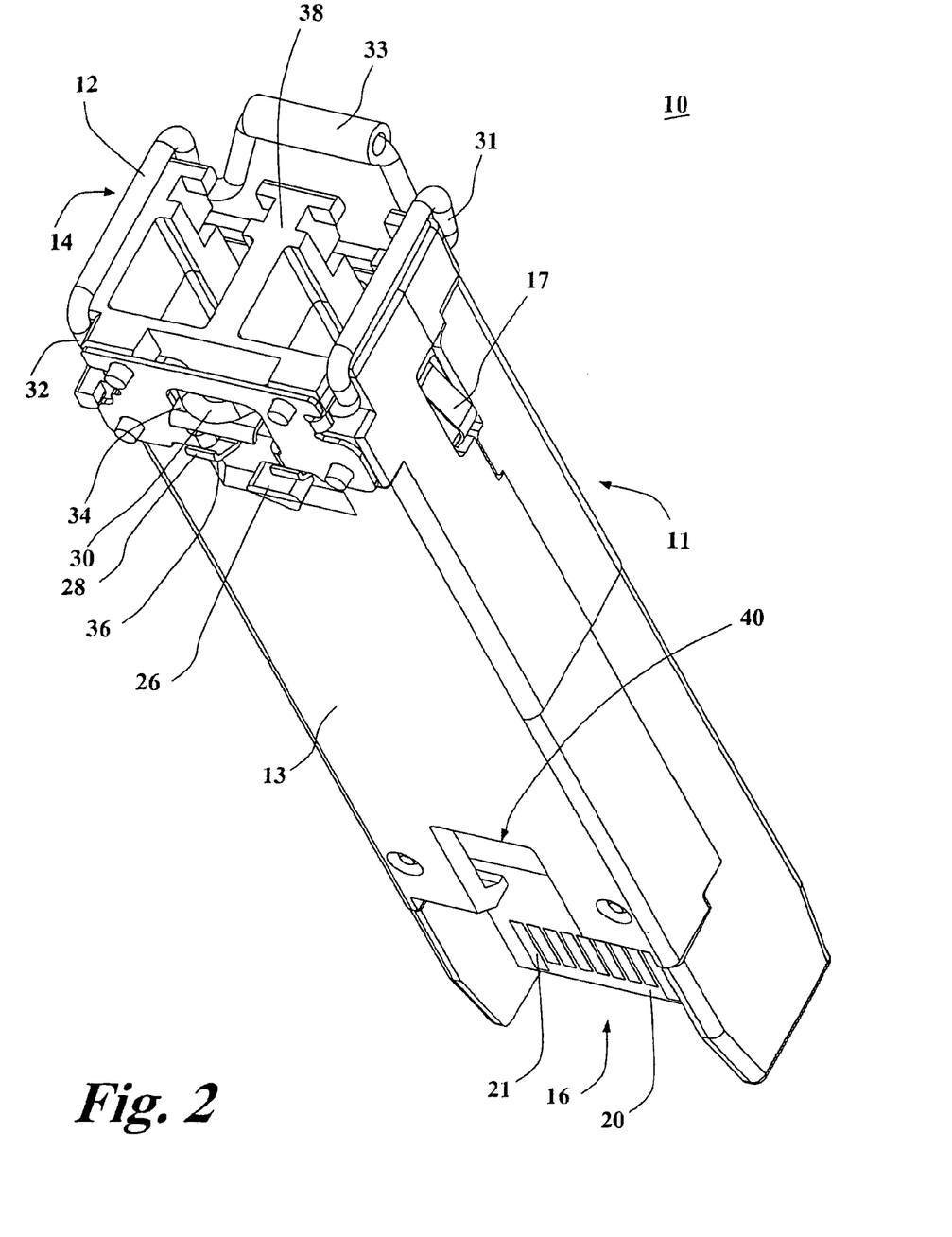
FIG. 2 is a perspective view of the bottom of the pluggable video module (PVM) shown in FIG. 1.
Figure 3:
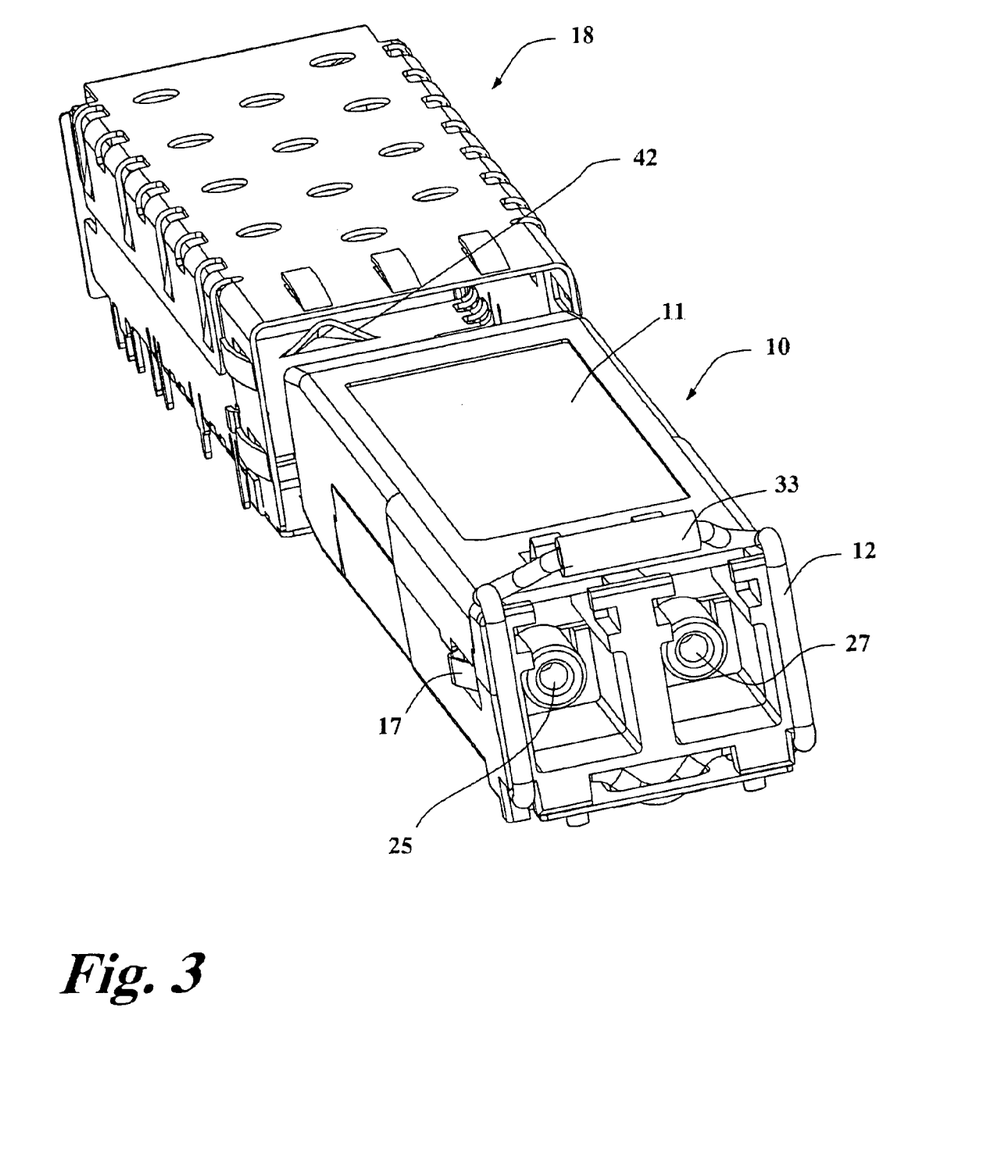
FIG. 3 is a perspective view of the top of a cage configured in accordance with the present invention and the pluggable video module (PVM) shown in FIGS. 1 and 2.
Figure 4:
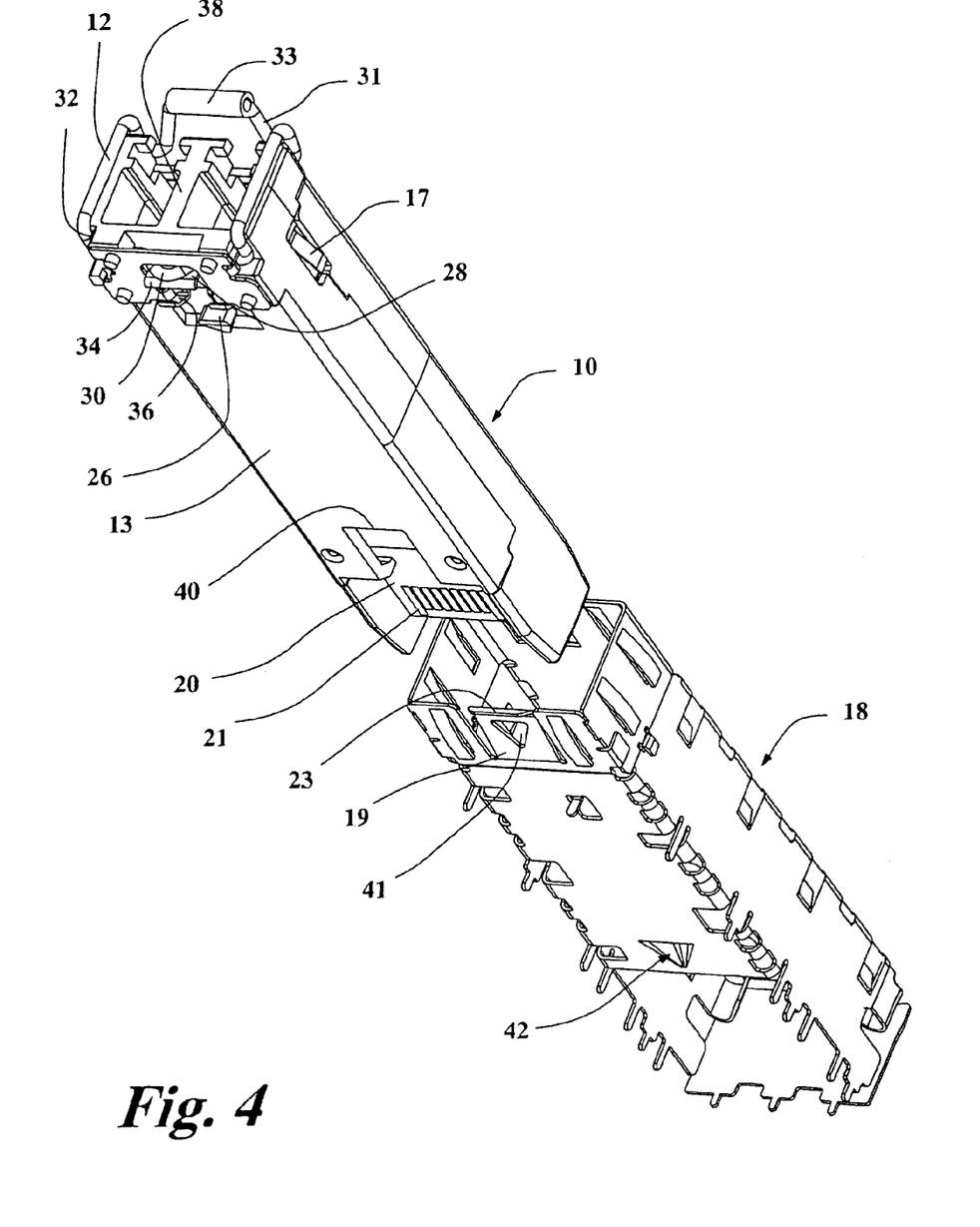
FIG. 4 is a perspective view of the bottom of the cage and the pluggable video module (PVM) shown in FIG. 3.
Figure 5:
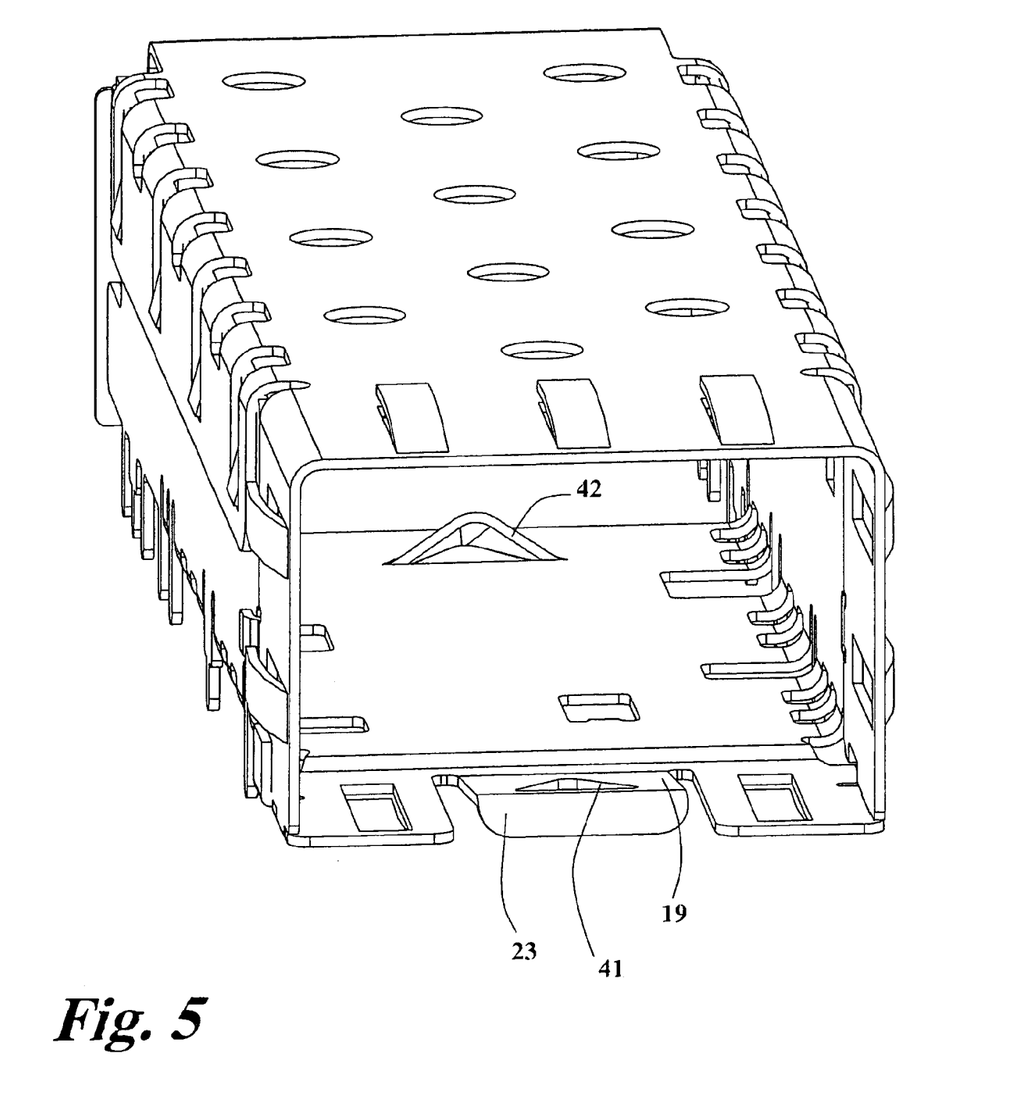
FIG. 5 is an enlarged perspective view of the cage shown in FIGS. 3 and 4.

Referring now to the drawings, FIGS. 1-4 show a pluggable video module (PVM) 10 configured in accordance with a first embodiment of the present invention. The pluggable video module (PVM) 10 includes a top 11, bottom 13, front 14, and back 16. A release lever or bail 12 is located at the front 14 of the PVM 10 for releasing the PVM 10 from a host device or cage. The back 16 of the PVM 10 is to be plugged into a host receptacle or a cage 18 (FIGS. 3-5). A printed circuit board (PCB) 20 is exposed at the back 16. The PCB 20 includes contact traces 21 of a male portion of a card edge connector, or a male portion of a ribbon connector for mating with socket of a host device, such as a connector mechanically identical to the commonly used MSA SFP connector. The PVM 10 includes optical ports 25 and 27, which are configured to receive LC optical connectors, as shown in FIG. 3. In other embodiments of the present invention the front 14 of the PVM 10 can include electrical connectors instead of optical connectors. Electrical contacts 17 on the surface of the housing 29 of the PVM 10 form an electrical connection with the cage 18 upon insertion of the PVM 10 into the cage 18. The electrical contacts 17 typically provide a grounding connection between the PVM 10 and the cage 18.

In accordance with the present invention, the optical connectors 25 and 27 are both transmit (TX) ports, or both receive (RX) ports. Video systems commonly utilize multiple unidirectional signal lines that are all transmit (TX) or receive (RX) ports. By configuring the PVM 10 to be a Dual TX module or a Dual RX module, the present invention enables a pluggable module to provide twice the signal channel capacity per module. Of course, the PVM 10 can also be configured to be a transceiver having a TX port and a RX port on the front 14 of the PVM 10.

The bottom 13 of the PVM 10 includes a tab 26 that extends beyond the planer surface of the bottom 13. The surface of the tab 26 is inclined upwards towards the front 14. The tab 26 is preferably triangular in shape. During insertion of the PVM 10 into the cage 18, the tab 26 slides under a bendable portion 19 of the host cage 18, and into a slot 41 on the cage 18 in order to lock the module 10 within a host cage or receptacle 18.

In order to remove the module 10 from the host receptacle 18, a slidably mounted member or wedge 28 on the PVM 10 slides under a lip 23 of the bendable portion 19 on the cage 18. The member 28 separates the tab 26 from within the slot 41 in the cage 18, thus unlocking the PVM 10 from the cage 18.

The wedge or slidable member 28 is driven towards the tab 26 by rotating a free end 31 of the bail 12 outwards, away from the front 14 of the PVM 10. The free end 31 may include a roller 33 on the bail 12 to facilitate rotation of the bail 12 by an operator. The roller 33 may also function to identity a specific module configuration by the color of the roller 33. The bail 12 includes a bump, bend, notch, or similar type of extension 30 on the rotatably mounted portion 32 of the bail 12. As the bail 12 rotates outward away from the face 38 of the PVM 10, the extension 30 is rotated, and force is applied to an actuation surface 34 on the member 28, thus driving the member 28 towards the tab 26. Inclined portions 36 on the member 28 fit under the lip 23 of the bendable portion 19 of the host device 18, separating the tab 26 from within the slot 41 in the cage 18, and thus releasing the module 10 from the cage 18.

After the free end 31 of the bail 12 is rotated outward away from the face 38 of the PVM 10, which drives the member or wedge 28 towards the tab 26, the exposed free end 31 can be used as a handle by an operator to manually pull out the PVM 10 from within the cage 18. The outwardly rotated bail 12 functions as a handle to enable the PVM 10 to be removed, even if a spring release mechanism of the host device fails.

In accordance with a further aspect of the present invention, the PVM 10 includes a key slot or key notch 40 in the bottom 13, and the host device or cage 18 includes a key tab 42. The key slot 40 in the module 10 is sized to mate with the key tab 42 in the cage 18. In this manner, the cage 18 is "dummy proof," meaning only a module having the correct key slot 40 can be inserted into the cage 18. For example, a conventional SFP transceiver module, which does not have a key slot 40, cannot be inserted into a cage 18 having the key tab 42. The back of a conventional transceiver module would impact the key tab 42 during insertion into the cage 18, thus preventing the conventional transceiver module from being installed by not being inserted all the way into the cage 18.

FIG. 5 is an enlarged perspective view of the cage 18 shown in FIGS. 3 and 4. In accordance with the present invention, the cage 18 includes the key tab 42, which is clearly shown in FIG. 5. The key tab 42 is preferably formed in the cage 18 by raising a cut out portion of the cage 18 towards the inside of the cage 18.

In accordance with another aspect of the present invention, the module 10 can be configured to be a transceiver, a dual transmitter (TX), a dual receiver (RX), a single transmitter (TX), or a single receiver (RX), each having variable types of connecters on the opposing end of the module, and wherein an electrical connector in the cage is electrically configured to receive any of these module configurations interchangeably. A more detailed explanation of the electrical connections between the PVM 10 and a host device will be discussed in regard to FIGS. 9-10.

Figure 6:
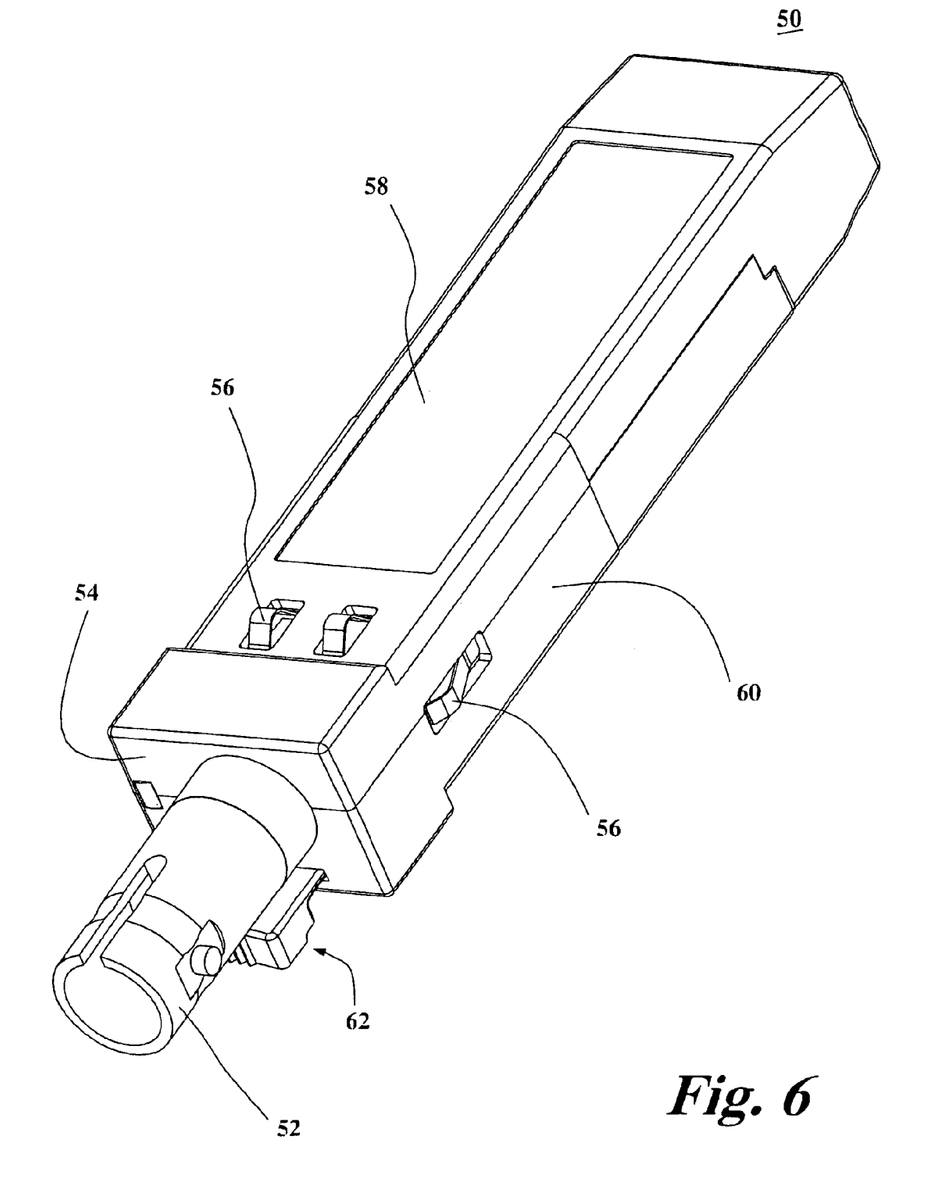
FIG. 6 is a perspective view of the top of a pluggable video module (PVM) configured in accordance with a second embodiment of the present invention.
Figure 7:
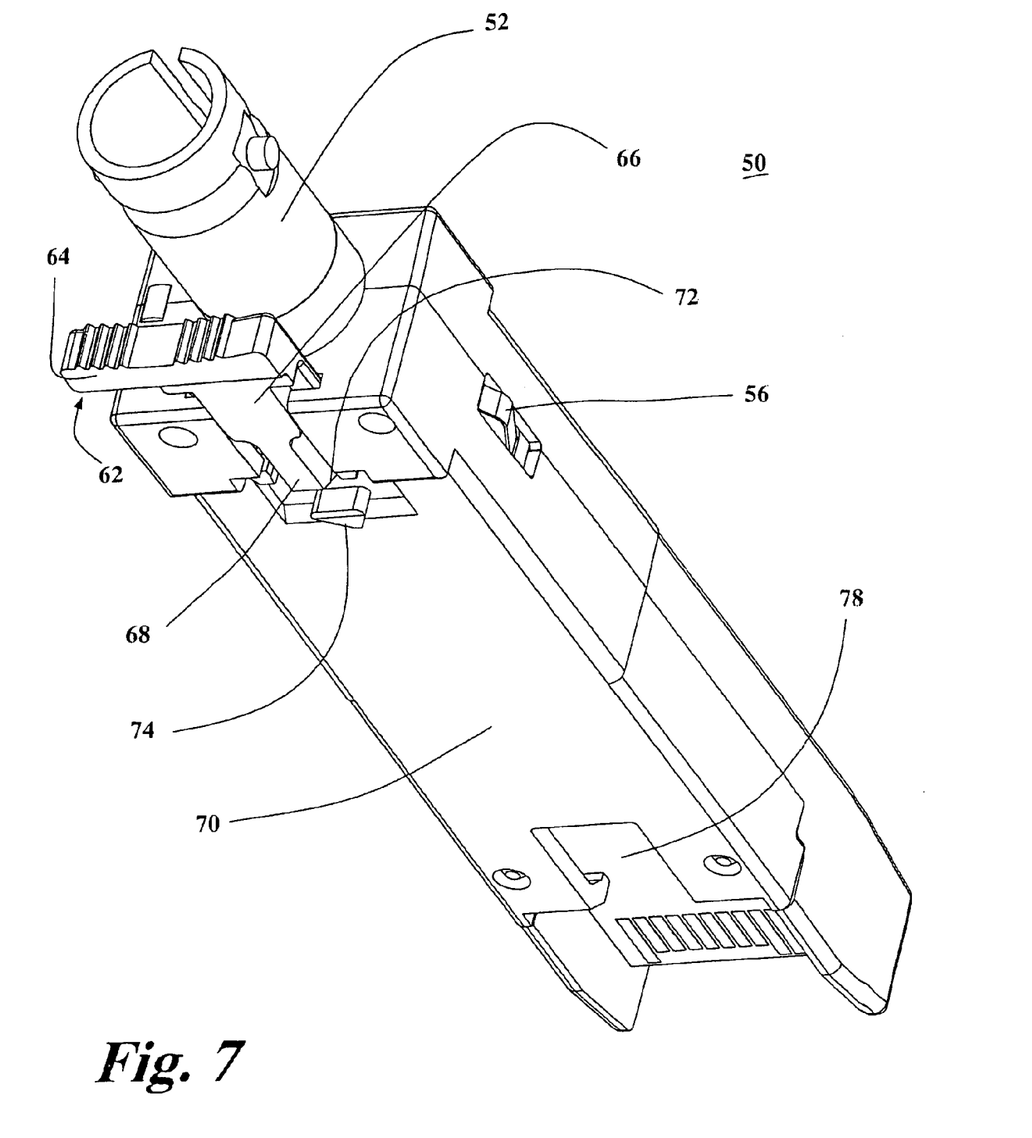
FIG. 7 is a perspective view of the bottom of the pluggable video module (PVM) shown in FIG. 6.

Turning now to FIGS. 6 and 7, another embodiment of the present invention is illustrated. Pluggable video module (PVM) 50 is shown having an optical ST connector 52 at the front 54 of the PVM 50. Electrical contacts 56 are included on the top 58 and sides 60 of the PVM 50. The electrical contacts 56 form an electrical connection with a cage upon insertion of the module 50 into the cage or host device. The electrical contacts 56 typically provide a grounding connection between the PVM 50 and a host device.

FIG. 7 illustrates a release lever 62 that functions as a locking and release mechanism. The release lever 62, comprising a foot 64, a lever 66, and a wedge 68, is attached to the bottom 70 of the module 50. An internal end of the wedge 68 includes an incline 72. This incline 72 functions to facilitate the wedge 68 sliding under the lip 23 of the bendable portion 19 of the cage 18 in order to separate and remove the locking tab 74 from inside the slot 41 of the cage 18.

In accordance with the present invention, a key slot 78 is formed in the bottom 70 of the PVM 50. Similar to the key slot 40 in PVM 10, the key slot 78 in PVM 50 is sized to receive the key tab 42 of cage 18. In this manner, only a module configured in accordance with the present invention can be installed within the cage 18.

Furthermore, in accordance with the present invention, the module 50 can be configured to be an optical transmitter or an optical receiver, wherein the cage 18 is electrically configured to receive either of these devices interchangeably.

Figure 8:
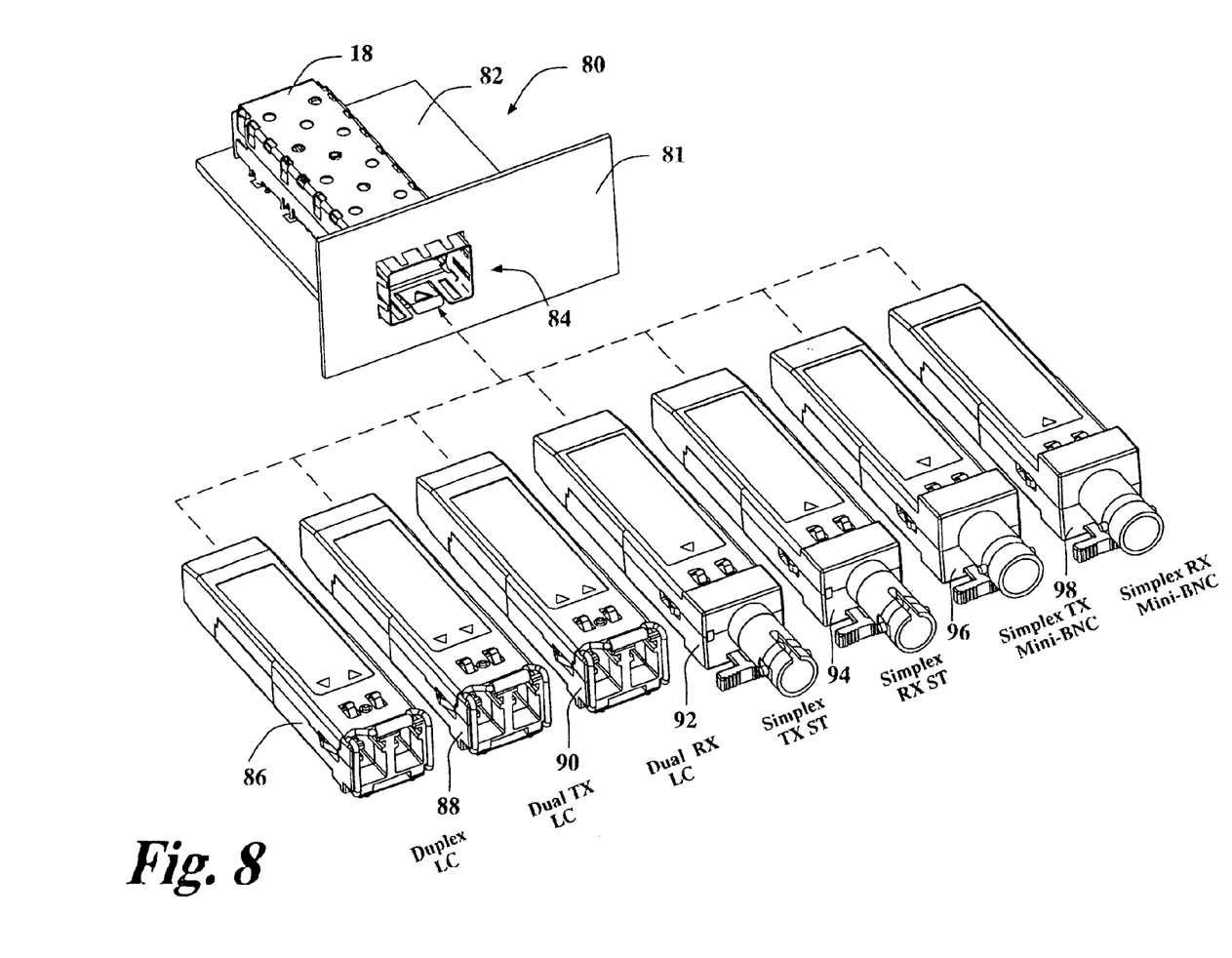
FIG. 8 is a perspective view of numerous pluggable video modules (PVMs) configured in accordance with additional embodiments of the present invention.

FIG. 8 illustrates a few of the potential interchangeable module configurations provided by the present invention. A host device 80 is shown including a face plate or bezel 81, a printed circuit board 82, and the cage 18. Numerous configurations of pluggable video modules (PVMs) are shown, wherein all the different module configurations are capable of being installed into the same port 84 of cage 18. The different pluggable module configurations include a Duplex LC 86, a Dual TX LC 88, a Dual RX LC 90, a Simplex TX ST 92, a Simplex RX ST 94, a Simplex TX Mini-BNC 96, and a Simplex RX Mini-BNC 98. The different modules are shown as examples, and the invention is not to be construed as being limited to these configurations. Furthermore, it should also be clear that the present invention includes both optical module configurations (i.e, LC and ST) and electrical module configurations (i.e, Mini-BNC).

Figure 9:
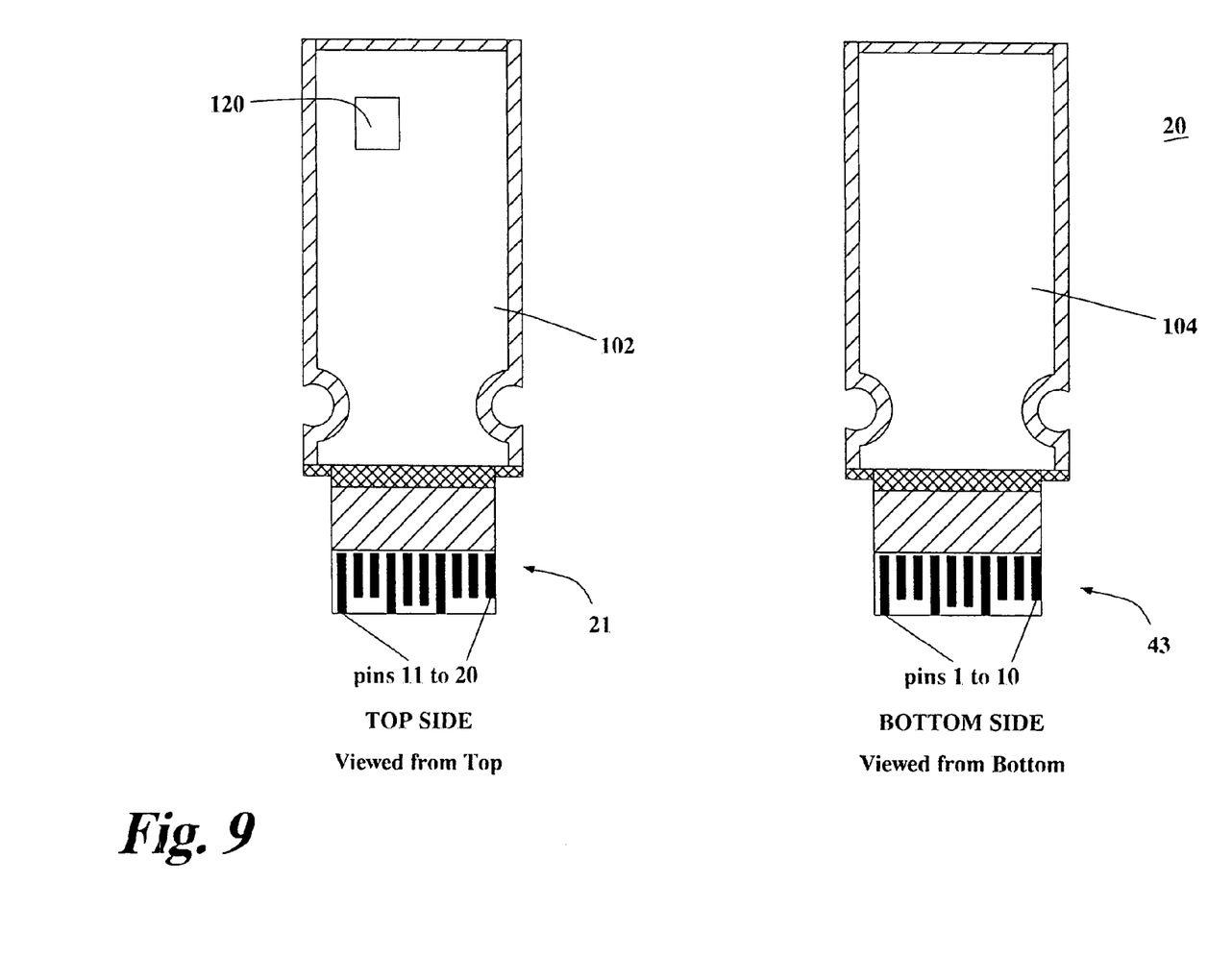
FIG. 9 is a top and a bottom view of a circuit board configured in accordance with the present invention.

FIG. 9 illustrates the top side 102 and the bottom side 104 of the printed circuit board (PCB) 20 configured in accordance with the present invention. The contract traces 21 on the bottom 104 of the PCB 20 were originally shown in FIG. 2. Contract traces 43 on the top of the PCB 20 are also illustrated.

In accordance with the present invention, the layout, length, and pin assignment of the contract traces 21 and 43 are the same for each of the different module configurations shown in FIG. 8. In this manner, a cage of a host device configured in accordance with the present invention is capable of receiving and functioning properly with any module configuration having a pin assignment in accordance with the present invention.

Figure 10:
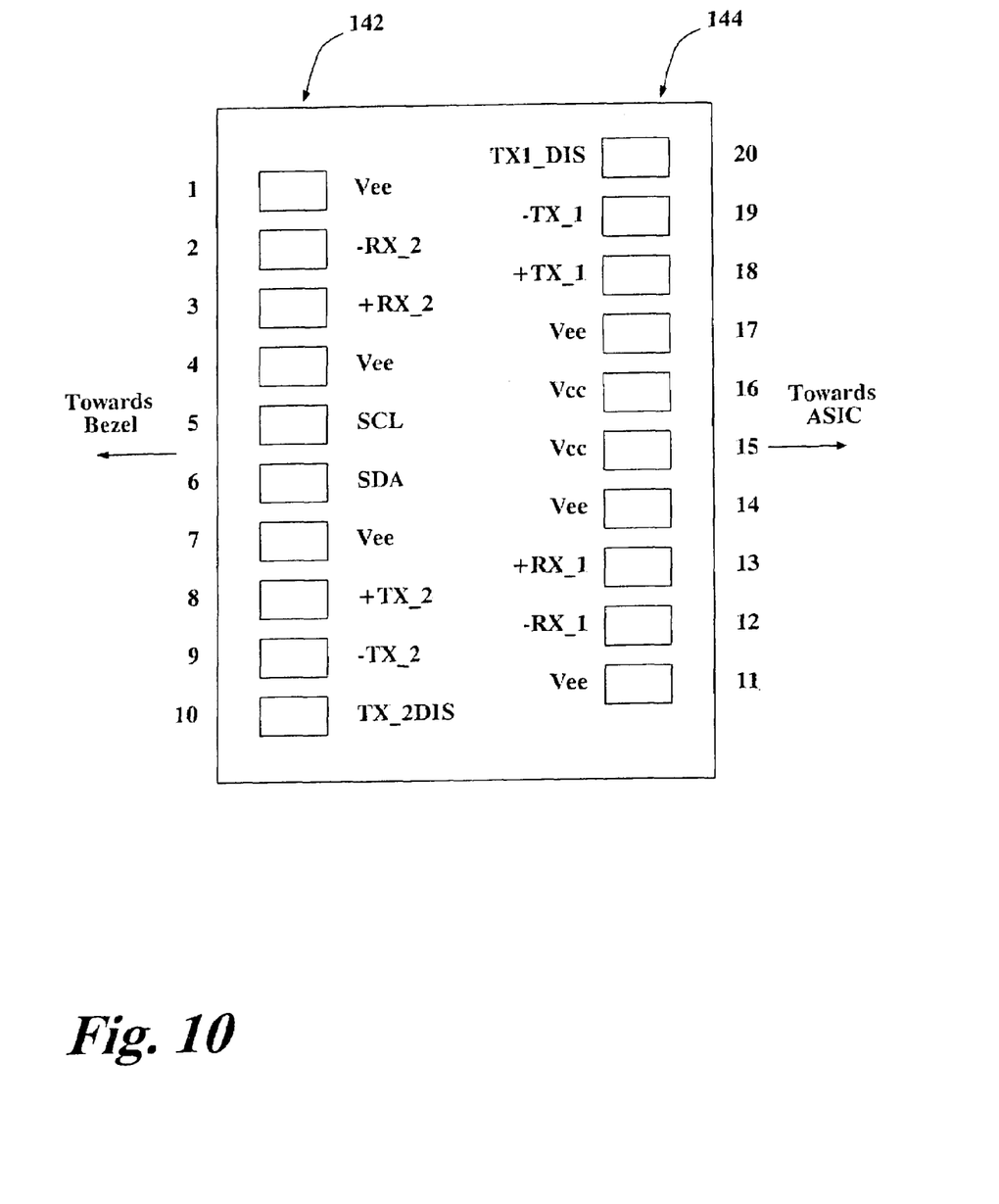
FIG. 10 is a pin connector diagram for a socket of a host device configured in accordance with the present invention.

FIG. 10 is a diagram of the pin connections for a socket 140 (FIGS. 11a-c) of a host device connector configured in accordance with the present invention. This configuration enables a host device to accommodate, via a single port, either an optical transceiver module, an electrical transceiver module, an optical dual TX module, an optical dual RX module, an electrical simplex TX module, or an electrical simplex RX module. As illustrated in FIG. 10, if the module is a dual TX module (optical or electrical), pins 18 and 19 correspond to a first TX channel, and pins 8 and 9 correspond to a second TX channel. If the module is a dual RX (optical or electrical), pins 12 and 13 correspond to the first RX channel, and pins 2 and 3 correspond to a second RX channel. If the module is a transceiver (optical or electrical), then the transceiver will utilize one of the TX channels and one of the RX channels.

Figure 11A:
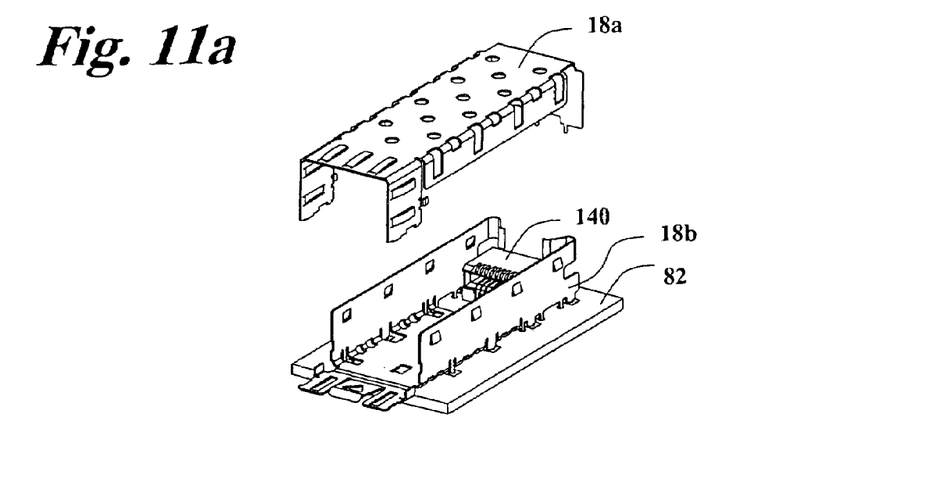
FIGS. 11a-11c are exploded views of a socket, and the cage and printed circuit board shown in FIG. 8.
Figure 11B:
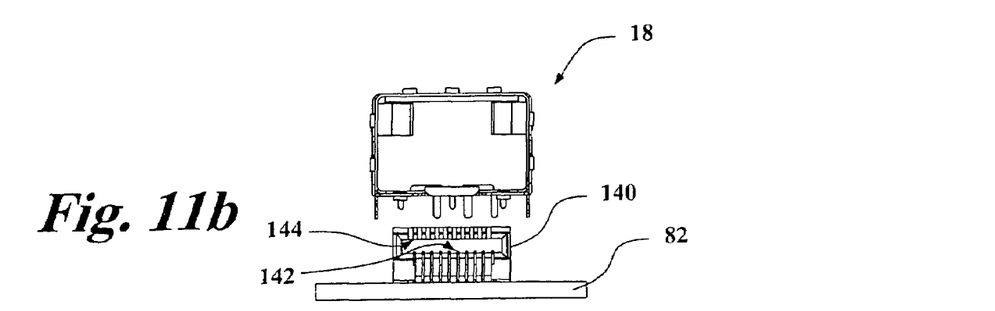
Figure 11C:
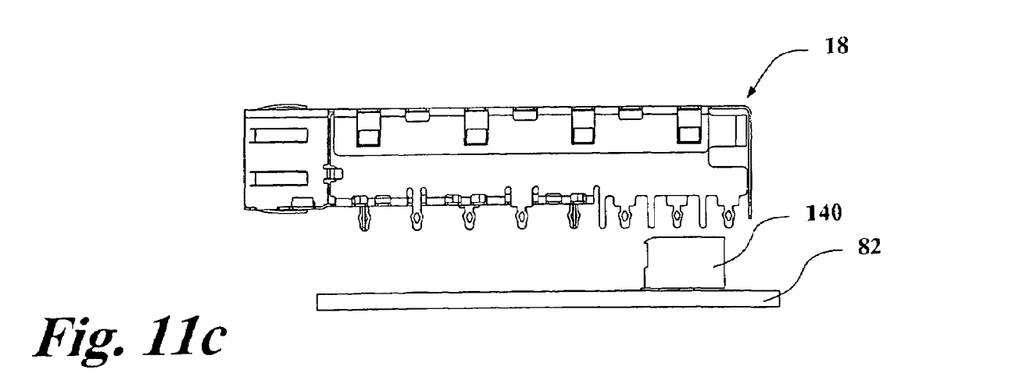

FIGS. 11a-11c are exploded views of the cage 18 and printed circuit board 82 shown in FIG. 8. FIG. 11a shows a top piece 18a and a bottom piece 18b of the cage 18. The cage 18 is mounted to the printed circuit board 82. A SFP socket 140 configured in accordance with the present invention is shown in FIGS. 11a-11c. The internal contacts 142, 144 of the SFP socket 140 correspond to the pin or contact layout shown in FIG. 10. Contacts or pins 142 on the bottom of the socket 140 correspond to pins or contacts identified by numbers 1-10 shown in FIG. 10. Pins or contacts 144 on the top of the socket 140 correspond to pins or contacts identified by numbers 11-20 in FIG. 10.

In accordance with a further aspect of the present invention, PCB 20 includes circuitry for handling pathological conditions associated with video signals, as illustrated by block diagram 120 in FIG. 9. A module configured in accordance with the present invention includes a pathological condition automatic power control (PC-APC) circuit 120 having a time constant that has been increased so it is less affected by the long string of 1's or 0's associated with a pathological condition of a video signal. For example, during a string of zero's, the power control loop of a conventional module will not react quickly enough to increase the drive current. Slowing down the power control loop is achieved by increasing the value of the loop capacitor in the automatic power control (APC) circuit.

Figure 12:
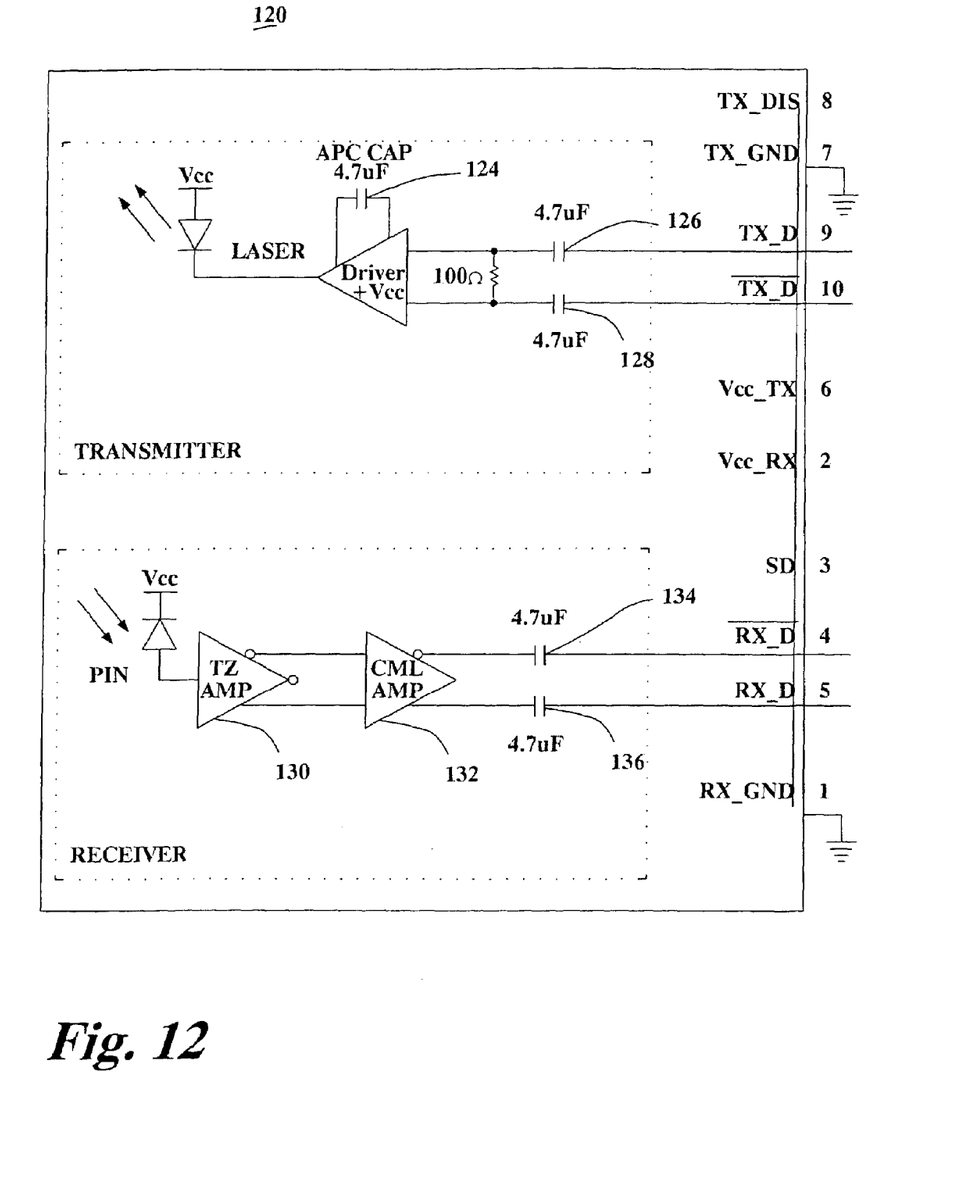
FIG. 12 is a circuit diagram of a power control circuit configured in accordance with the present invention.

FIG. 12 is a circuit diagram of the pathological condition automatic power control (PC-APC) circuit shown 120 in FIG. 9. In accordance with the present invention, the loop capacitor 124 of the PC-APC 120 was increased to 4.7 uF, and the input AC coupling capacitors 126, 128 were increased to 4.7 uF to accommodate the low frequency of a pathological pattern. Similarly, conventional optical receivers use AC coupled amplifiers with time constants in the range of 1 ms. This means they will not have an adequate low-frequency response to properly handle a long run of a high- or low-duty cycle signal. Thus, in accordance with the present invention, the transimpedance amplifier 130 was chosen for its low frequency extension, the post amplifier 132 was chosen for its low frequency extension, and the output AC coupling capacitors 134, 136 were increased to 4.7 uF, as shown in FIG. 12.

It is to be understood that the foregoing description is merely a disclosure of particular embodiments and is no way intended to limit the scope of the invention. Several possible alterations and modifications will be apparent to those skilled in the art.

We claim:

1. A device comprising:
    a housing having a top, a bottom, a front, and a back;
    a locking and release mechanism attached to the housing;
    an electrical connector attached to the back of the housing;
    only one optical connector attached to the front of the housing, the only one optical connector is a simplex optical connector; and
    pathological circuitry for handling pathological conditions associated with digital video signals, the pathological circuitry including a first capacitor and a second capacitor, the first capacitor having a value of 4.7 uF, and the second capacitor having a value of 4.7 uF.

2. A device according to claim 1 wherein the only one optical connector is a simplex transmitting optical port.

3. A device according to claim 1 wherein the only one optical connector is a simplex receiving optical port.

4. A device according to claim 1 wherein the only one optical connector is a simplex transmitting ST connector.

5. A device according to claim 1 wherein the only one optical connector is a simplex receiving ST connector.

6. A device comprising:

a housing having a top, a bottom, a front, and a back;

a locking and release mechanism attached to the housing;

a first electrical connector attached to the back of the housing;

a second electrical connector attached to the front of the housing; and pathological circuitry for handling pathological conditions associated with digital video signals, the pathological circuitry including a first capacitor and a second capacitor, the first capacitor having a value of 4.7 uF, and the second capacitor having a value of 4.7 uF.

7. A device according to claim 6 wherein the second electrical connector includes a transmitting electrical port.

8. A device according to claim 6 wherein the second electrical connector includes a receiving electrical port.

9. A device according to claim 6 wherein the second electrical connector includes a simplex transmitting electrical port.

10. A device according to claim 6 wherein the second electrical connector includes a simplex receiving electrical port.

11. A device according to claim 6 wherein the second electrical connector includes a simplex TX Mini-BNC electrical port.

12. A device according to claim 6 wherein the second electrical connector includes a simplex RN Mini-BNC electrical port.

13. A device comprising:

a housing;

an electrical connector attached to the housing;

only one optical connector attached to the housing, the only one optical connector is a simplex optical connector;

a printed circuit board mounted in the housing;

pathological circuitry mounted on the printed circuit board, the pathological circuitry for handling pathological conditions associated with digital video signals, the pathological circuitry including a first capacitor and a second capacitor, the first capacitor having a value of 4.7 uF, and the second capacitor having a value of 4.7 uF.

14. A device according to claim 13, further comprising a locking and release mechanism attached to the housing.

15. A device according to claim 14 wherein the only one optical connector is a simplex transmitting optical port.

16. A device according to claim 14 wherein the only one optical connector is a simplex receiving optical port.

17. A device according to claim 14 wherein the only one optical connector is a simplex transmitting ST connector.

18. A device according to claim 14 wherein the only one optical connector is a simplex receiving ST connector.

19. A device according to claim 14 wherein the only one optical connector is a simplex transmitting LC connector.

20. A device according to claim 14 wherein the only one optical connector is a simplex receiving LC connector.

* * * * *